(12) United States Patent　　　(10) Patent No.:　US 12,570,548 B2
Wood　　　(45) Date of Patent:　Mar. 10, 2026

(54) COOLING WATER MANAGEMENT SYSTEMS AND ASSOCIATED METHODS FOR USING THE SAME

(71) Applicant: Tommy Wood, Irmo, SC (US)

(72) Inventor: Tommy Wood, Irmo, SC (US)

(73) Assignee: Prestige Products, LLC, Rockford, MI (US)

( * ) Notice:　Subject to any disclaimer, the term of this patent is extended or adjusted under 35 U.S.C. 154(b) by 863 days.

(21) Appl. No.: 17/898,741

(22) Filed:　Aug. 30, 2022

(65)　　Prior Publication Data

US 2023/0080050 A1　Mar. 16, 2023

Related U.S. Application Data

(60) Provisional application No. 63/242,527, filed on Sep. 10, 2021.

(51) Int. Cl.
　*C02F 1/38*　　(2023.01)
　*B04C 3/06*　　(2006.01)
　*B04C 9/00*　　(2006.01)
(52) U.S. Cl.
　CPC .................. *C02F 1/38* (2013.01); *B04C 3/06* (2013.01); *B04C 9/00* (2013.01); *B04C 2009/001* (2013.01)
(58) Field of Classification Search
　CPC ..... C02F 1/38; B04C 9/00; B04C 3/06; B04C 2009/001
　See application file for complete search history.

(56)　　References Cited

U.S. PATENT DOCUMENTS

| | | | |
|---|---|---|---|
| 3,669,425 A | 6/1972 | Copeland | |
| 3,997,635 A | 12/1976 | Hallgren | |
| 4,153,559 A | 5/1979 | Sanderson | |
| 4,172,786 A | 10/1979 | Humphrey et al. | |
| 4,202,847 A | 5/1980 | Ernst et al. | |
| 4,519,919 A | 5/1985 | Whyte et al. | |
| 4,678,409 A | 7/1987 | Kurokawa | |
| 4,764,283 A | 8/1988 | Ashbrook et al. | |
| 5,145,585 A * | 9/1992 | Coke ...................... | C02F 1/385 261/DIG. 11 |
| 5,278,455 A | 1/1994 | Hamos | |
| 5,453,207 A | 9/1995 | Simpson et al. | |
| 5,591,340 A | 1/1997 | Meikrantz et al. | |
| 5,730,861 A | 3/1998 | Sterghos et al. | |
| 5,735,789 A | 4/1998 | Borgström et al. | |
| 5,779,619 A | 7/1998 | Borgström et al. | |
| 5,858,219 A | 1/1999 | Kusmierz et al. | |
| 5,935,431 A | 8/1999 | Korin | |
| 5,970,729 A | 10/1999 | Yamamoto et al. | |
| 6,012,708 A | 1/2000 | Nagano | |
| 6,299,761 B1 | 10/2001 | Wang | |
| 6,446,941 B1 | 9/2002 | Maheshwari et al. | |

(Continued)

FOREIGN PATENT DOCUMENTS

| | | |
|---|---|---|
| CN | 2355771 | 12/1999 |
| CN | 1844824 | 10/2006 |

(Continued)

*Primary Examiner* — Youngsul Jeong
(74) *Attorney, Agent, or Firm* — King & Partners, PLC

(57)　　ABSTRACT

A water cooling/recirculating management system, including: a controller; a fluid displacement pump; a centrifugal separator; a germicide generator; and a primary side stream magnetic field generator.

20 Claims, 4 Drawing Sheets

(56)　　　　　　References Cited

U.S. PATENT DOCUMENTS

| | | | |
|---|---|---|---|
| 6,929,740 B2 * | 8/2005 | Hayes | .................... C02F 1/4606 |
| | | | 204/229.4 |
| 7,683,344 B2 | 3/2010 | Tribelsky et al. | |
| 7,811,347 B2 | 10/2010 | Carlsson et al. | |
| 7,824,458 B2 | 11/2010 | Borgström et al. | |
| 7,824,459 B2 | 11/2010 | Borgström et al. | |
| 7,854,597 B2 | 12/2010 | Stiles, Jr. et al. | |
| 7,927,395 B2 | 4/2011 | Szepessy et al. | |
| 8,182,408 B2 | 5/2012 | Isaksson et al. | |
| 8,223,495 B1 | 7/2012 | Carlson et al. | |
| 9,695,073 B2 | 7/2017 | DiMascio et al. | |
| 9,943,618 B2 | 4/2018 | Liao et al. | |
| 10,724,515 B1 | 7/2020 | Cook et al. | |
| 10,851,638 B2 | 12/2020 | Payne et al. | |
| 2003/0173688 A1 | 9/2003 | Koo | |
| 2007/0102367 A1 | 5/2007 | Owens | |
| 2009/0013658 A1 | 1/2009 | Borgstrom et al. | |
| 2010/0011723 A1 | 1/2010 | Szepessy et al. | |

FOREIGN PATENT DOCUMENTS

| | | |
|---|---|---|
| CN | 2906512 | 5/2007 |
| CN | 201392109 | 1/2010 |
| WO | WO 2007/060466 | 5/2007 |

* cited by examiner

Steel band wrapped around all the magnets, and in direct contact with them, that focuses the otherwise-wasted (extending radially outward), magnetic flux lines into the pipe.

COOLING WATER MANAGEMENT SYSTEMS AND ASSOCIATED METHODS FOR USING THE SAME

CROSS-REFERENCE TO RELATED APPLICATIONS

This application claims the benefit of U.S. Provisional Application Ser. No. 63/242,527, entitled "COOLING WATER MANAGEMENT SYSTEMS AND ASSOCIATED METHODS FOR USING THE SAME," filed Sep. 10, 2021—which is hereby incorporated herein by reference in its entirety, including all references cited therein.

STATEMENT REGARDING FEDERALLY SPONSORED RESEARCH OR DEVELOPMENT

Not applicable.

REFERENCE TO A SEQUENCE LISTING

Not applicable.

BACKGROUND OF THE INVENTION

1. Field of the Invention

The present invention relates in general to water management systems, and, more particularly, to cooling and/or recirculating water management systems that eliminate the need for chemicals, bleed water, and labor to maintain recirculating water systems at peak efficiency. This results in: (1) up to a 40% savings in energy consumption; (2) the elimination of chemical treatment costs; (3) the elimination of blowdown water and sewer costs; (4) the elimination of labor to clean/restore heat exchange equipment; and (5) greatly extended equipment life. The water management systems of the present invention also result in the elimination of environmental pollution from chemical bleed, and personnel protection against waterborne diseases, such as *Legionella*.

While evaporative water cooling for heat exchange systems (e.g., cooling towers, chillers, compressors, heat exchangers, HVAC systems, etcetera) and heat rejection processes is the most efficient cooling method, it is also the most aggravating to maintain because of scale, corrosion, algae, bacteria, biofilm, and sludge. The present invention eliminates the above-identified problems using physics instead of conventional, environmentally problematic chemistry by synergistically utilizing a centrifugal separator, a germicide generator, and a magnetic field generator.

2. Background Art

Water management systems and associated components have been known in the art for years, and are the subject of a plurality of patents including, for example: U.S. Pat. No. 8,223,495 entitled "Electronic Device Cooling System," U.S. Pat. No. 5,145,585 entitled "Method and Apparatus for Treating Water in a Cooling System," U.S. Pat. No. 4,764, 283 entitled "Method and Apparatus for Treating Cooling Tower Water," U.S. Pat. No. 4,519,919 entitled "Method and Apparatus for Magnetically Treating Fluids," U.S. Pat. No. 4,202,847 entitled "Apparatus and Method for Cooling Water Especially in Cooling Towers," U.S. Pat. No. 4,172, 786 entitled "Ozonation of Cooling Tower Waters," U.S. Pat. No. 4,153,559 entitled "Water Treatment Device and Method for Manufacturing Same," U.S. Pat. No. 3,997,635 entitled "Method and Device for Evaporative Cooling," U.S. Pat. No. 3,669,425 entitled "Water Cooling Tower," Chinese Patent Number 201392109 entitled "Closed Type Cooling Tower," Chinese Patent Number 2906512 entitled "Energy-Saving Environmental-Protection Cooling Tower," and Chinese Patent Number 1844824 entitled "Environment-Friendly Water-Saving Cooling Tower"—all of which are hereby incorporated herein by reference in their entirety including all references cited therein.

U.S. Pat. No. 8,223,495 appears to disclose cooling systems for providing cooled air to electronic devices. The systems can include large storage tanks or waste treatment systems to improve the efficiency of the plant and reduce impact on the environment.

U.S. Pat. No. 5,145,585 appears to disclose a method for treating water in a cooling system that includes a cooling tower and heat exchanger. The method includes the steps of removing water from the main cooling water circuit, serially subjecting the water to magnetic treatment, treatment with ozone, filtering with a centrifugal separator, and then returning to the main cooling water circuit. Underflow from the centrifugal separator is filtered with a bag filter, and the filtered water returned to the magnetic treatment step. The pH of the water may be controlled by regulating the production of dry air supplied to the ozone generator.

U.S. Pat. No. 4,764,283 appears to disclose an apparatus and method of reducing agglomeration of fluids consisting of the vigorous agitation of the liquid by a double opposed vortex nozzle and the passing of the liquid through a magnetic field. One of the opposed nozzles may have ozone gas forced through it for treating sewage. The apparatus and method may also be used to treat cooling tower water.

U.S. Pat. No. 4,519,919 appears to disclose an apparatus for and method of magnetically treating flowing fluids that includes a housing into which a fluid stream is directed and in which the stream is divided into a plurality of separate flow paths. Each of the flow paths within the housing is subjected to a monopolar magnetic influence and a baffle configured to induce turbulence in the flow path to insure exposure of all of the fluid in the path to the monopolar magnetic influence. The separate flow paths are at least partially recombined to a single flow path and discharged from the housing.

U.S. Pat. No. 4,202,847 appears to disclose a water cooling tower and method which provides for both wet and dry cooling within the same vertical space and significantly reduces the discharge of water particles out of the tower. Water is deposited on one side of each of a plurality of trickler plates and flows downwardly under the influence of gravity substantially undisturbed as a low speed film. Air flows at low speed by natural draught in a substantially undisturbed path on the other side of each of the plates.

U.S. Pat. No. 4,172,786 appears to disclose a continuous ozone injection into water that circulates between a cooling tower and heat exchanger with heavy scale deposits inhibits formation of further deposits, promotes flaking of existing deposits, inhibits chemical corrosion and controls algae and bacteria.

U.S. Pat. No. 4,153,559 appears to disclose a device for the magnetic treatment of water and other liquids, having a pair of concentric tubular casings which are spaced from each other so as to form an annular treatment chamber. The inner casing contains an elongated magnet having two or more longitudinally spaced poles, and the outer casing is made of a magnetic material which serves to concentrate the magnetic lines of force within the annular chamber. The inner casing is supported within the outer casing by means of elastic, non-magnetic sleeves which are positioned over opposite ends of the inner casing and compressed between it and the inner surface of the outer casing so that the treatment chamber is rendered fluid-tight and the inner casing and magnet are prevented from shifting longitudinally with respect to the outer casing. The device is manufactured by pressing resilient end caps on opposite ends of the magnet and pressing this assembly into the inner casing, inserting the inner casing in the outer casing and then wedging the sleeves between them.

U.S. Pat. No. 3,997,635 appears to disclose a method and a device for preventing formation of mist by the discharge of moistened air from an evaporative cooler, primarily a cooling tower of the multi-layer type, comprising a contact body composed of a plurality of layers forming between themselves gaps passed by water to be cooled and atmospheric air which is moistened and heated by contact with the water in counter-current or cross-current flow. Under certain conditions as when the temperature of the atmospheric air is so low, when the moistened and heated air is discharged to the atmosphere and cooled to the low temperature of the latter, the moisture contained in the discharged air will be condensed and precipitated in the form of mist to the extent it exceeds the saturation point of the air. Such precipitation can be avoided by mixing the moistened air prior to its escape into the atmosphere with preheated dry air. The invention provides a novel method and device for producing such preheated dry air by causing part of the introduced atmospheric air to pass through gaps of the contact body shut off from the flow of water passing through the body, whereby this air is heated without change of its moisture content by heat exchange with the warm water flowing through adjacent gaps. The moist air current from the gaps wetted by the water flowing through them and the dry air current from the gaps not accessible to the water provided an air mixture which, even when discharged into the relatively cold atmospheric air and thereby cooled to the low temperature thereof, will not contain so much moisture that the saturation limit is surpassed and condensed vapor precipitated. Means are also disclosed to adjust the ratio of the gaps open to the water flow to the gaps shut off from said flow so as to reduce the number of dry gaps in which no cooling effect is produced to the minimum necessary for avoiding mist formation.

U.S. Pat. No. 3,669,425 appears to disclose a water cooling tower which comprises a blower opening into the bottom of the tower for introducing or blowing air into the tower. A continuously walled wet decking arranged in a spiral mounted above the air inlet port and having a large number of regularly spaced projections arranged in an inclined checkerboard or step like pattern to control the counterflowing air and water in the tower. A spray tree for introducing water into the vessel is mounted above the wet decking and a mist eliminator is mounted above the spray tree. The mist eliminator is also constructed in the form of a continuously spirally wound vertical wall with adjacent surfaces of the eliminator wall being separated by a multiplicity of step like baffles.

Chinese Patent Number 201392109 appears to disclose a closed type cooling tower, which includes a fan arranged at the top of the tower, a water-catching tank arranged at the bottom of the tower, a medium inlet and a medium outlet, a heat exchanger coil arranged in the tower and a spraying water-distributing system, wherein two ends of the heat exchanger coil are respectively communicated with the medium inlet and the medium outlet, the spraying water-distributing system is connected to the water-catching tank through a cycling water pump; moreover, the spraying water-distributing system is also provided with a plurality of nozzles, wherein the heat exchanger coil is formed by a capillary; as the capillary is characterized by large heat exchange area, thin wall, good thermal conductivity, uniform heat exchange, and the like, by adopting the capillary as the heat exchanger coil, on one hand, the heat exchange effect of the cooling tower can be improved, on the other hand, under the condition of equal heat exchange requirement, the heat exchanger coil which is formed by the capillary can be designed to be smaller, thereby leading the volume of the cooling tower to be smaller.

Chinese Patent Number 2906512 appears to disclose a water-saving and environment-friendly cooling tower, which relates to a cooling device for cooling the circulating water. An air intake shutter of air cooler is symmetrically arranged on the sidewall of the cooling tower body, an air cooler is arranged close to the air intake shutter, a distributing pipe in the air cooler inside is connected with a circulating water intake pipe, an outlet pipe of the air cooler is connected with a water distributor, a lower catchment tank of the air cooler is connected with a circulating water outlet pipe by a bypass pipe. The air cooler is arranged above a water collector, the water distributor is arranged between the two air coolers. The utility model is water saving, the air cooler is used to precool the circulating water, the cooling load of the filler segment and the quantity of the evaporated water are decreased. The air becomes hot and dry when going through the air cooler and the humidity of the hot wet air, which can reduce the humidity ratio of the hot and wet air after being exchanged in the filler layer, and the water fog generated at the top of the tower is avoided or reduced, which is favorable to environmental protection.

Chinese Patent Number 1844824 appears to disclose an environment-friendly water-saving cooling tower, wherein the side wall of the tower is symmetrically distributed with wind inlet shutters of air cooler; the inner side that is near to the shutters is distributed with an air cooler; the water distributing tube at the inner side of air cooler is through to the water inlet tube of cycle water, while the water outlet tube of air cooler is through to the water distributor; the lower water tank of air cooler via the branch tube is through to the reflux tube of recycle water; the air cooler is above the water collector; the water distributor is between two air coolers. The invention uses an air cooler to pre-cool the cycle water, to reduce the load, the steam amount, and the water consumption.

While the above-identified patents do appear to disclose various water management systems and associated components, their configurations remain non-desirous and/or problematic inasmuch as, among other things, none of the above-identified systems appear to provide a water cooling/recirculating management system that synergistically utilizes a centrifugal separator, a germicide generator, and a magnetic field generator.

These and other objects of the present invention will become apparent in light of the present specification, claims, and drawings.

SUMMARY OF THE INVENTION

The following presents a simplified summary in order to provide a basic understanding of some aspects of the claimed subject matter. This summary is not an extensive overview, and is not intended to identify key/critical elements or to delineate the scope of the claimed subject matter.

Its purpose is to present some concepts in a simplified form as a prelude to the more detailed description that is presented later.

The present invention is directed to a water cooling/recirculating management system, comprising, consisting essentially of, and/or consisting of: (a) a controller; (b) a fluid displacement pump; (c) a centrifugal separator; (d) a germicide generator; and (e) a primary side stream magnetic field generator.

In a preferred embodiment of the present invention, the controller is in communication with the fluid displacement pump, the centrifugal separator purge valve, and the germicide generator.

In another preferred embodiment of the present invention, the fluid displacement pump extracts water from a main stream basin, prefilters the extracted water prior to association with the centrifugal separator, and displaces the extracted water through a closed-circuit side stream.

In yet another preferred embodiment of the present invention, the centrifugal separator includes an inlet, an outlet, and a solids collection chamber.

In one aspect of the present invention, the centrifugal separator separates solids, prevents sludge accumulation, replaces blow-down and/or bleed, removes particles down to 40 microns, contains no filter medium or moving parts, provides for the continuous removal of solids, and/or provides for a purging mechanism that releases solids collected in the collection chamber.

In accordance with a preferred embodiment of the present invention, the germicide generator comprises one or more electrodes fabricated from approximately (i.e., +/−3%) 93 percent copper and approximately (i.e., +/−3%) 7 percent silver.

In accordance with another preferred embodiment of the present invention, the germicide generator comprises at least one electrode fabricated from approximately (i.e., +/−3%) 90 percent copper and approximately (i.e., +/−3%) 10 percent silver.

In a preferred embodiment of the present invention, the germicide generator eliminates the need for chemicals, utilizes a copper/silver ionization system, and/or destroys algae, bacteria, and/or viruses.

In another preferred embodiment of the present invention, the germicide generator operates in an off mode, a continuous on mode, and/or a non-continuous pulse mode.

In yet another preferred embodiment of the present invention, the primary side stream magnetic field generator comprises one or more permanent ceramic magnets. In this embodiment, the permanent ceramic magnet preferably includes side-to-side polarity that is mounted to a non-ferrous pipe having the south pole facing inward toward the water.

In a preferred embodiment of the present invention, the primary side stream magnetic field generator prevents scale formation, de-scales existing surfaces and piping, inhibits both general and galvanic corrosion, and, if present, increases heat exchanger efficiency by approximately (i.e., +/−3%) 5-55 percent.

In another preferred embodiment of the present invention, the water cooling/recirculating management further comprises an ultra violet light source, an ozone generator, and/or a cooling fan.

In yet another preferred embodiment of the present invention, the water cooling/recirculating management system further comprises a primary, secondary and/or tertiary main stream magnetic field generator.

In one embodiment of the present invention, the water cooling/recirculating management system further comprises a pressure switch to indicate the presence, flowrate, and/or velocity of the side stream water flow.

BRIEF DESCRIPTION OF THE DRAWINGS

Certain embodiments of the present invention are illustrated by the accompanying figures. It will be understood that the figures are not necessarily to scale and that details not necessary for an understanding of the invention or that render other details difficult to perceive may be omitted.

It will be further understood that the invention is not necessarily limited to the particular embodiments illustrated herein.

Figure 1:
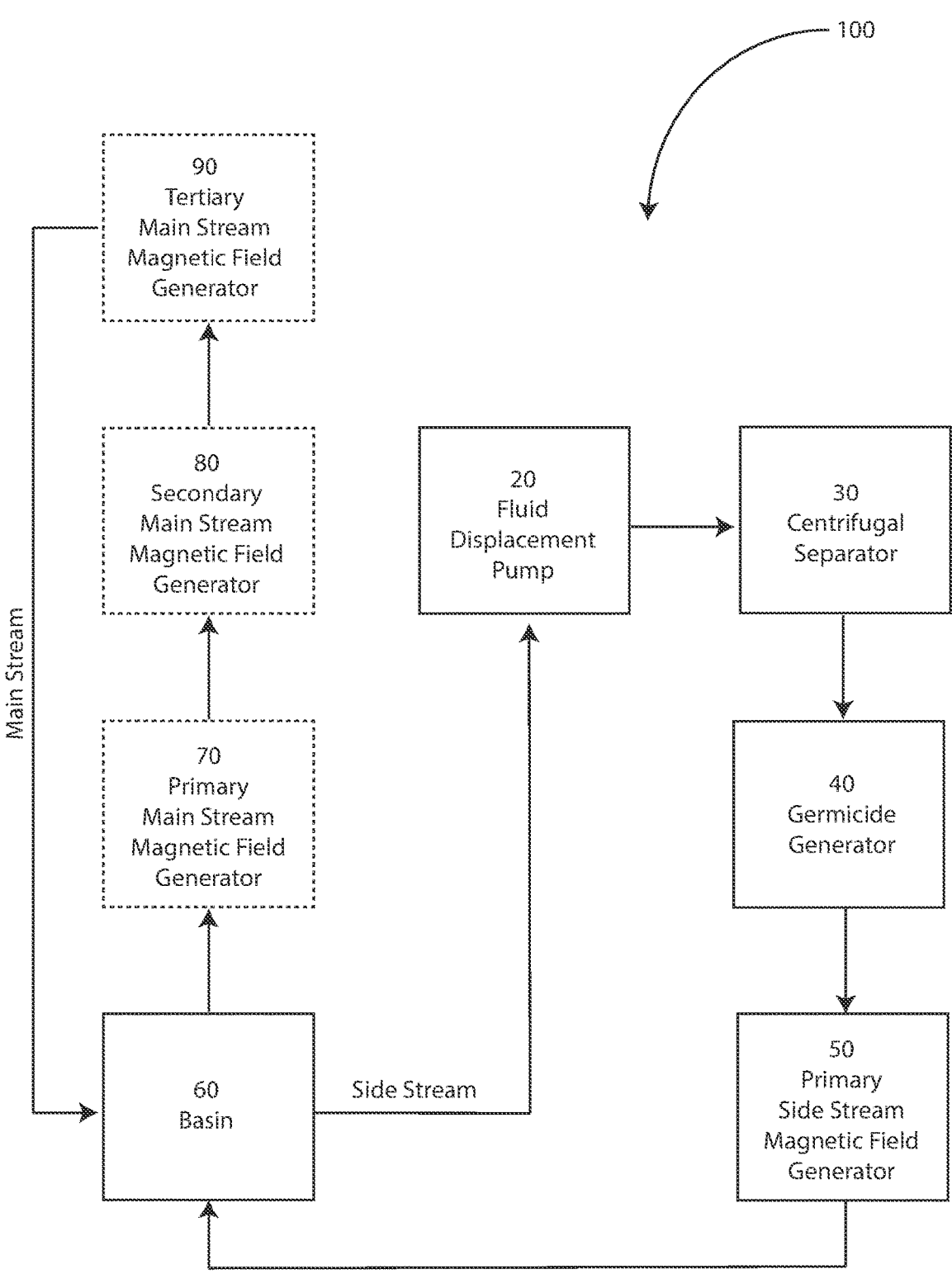
Figure 2:
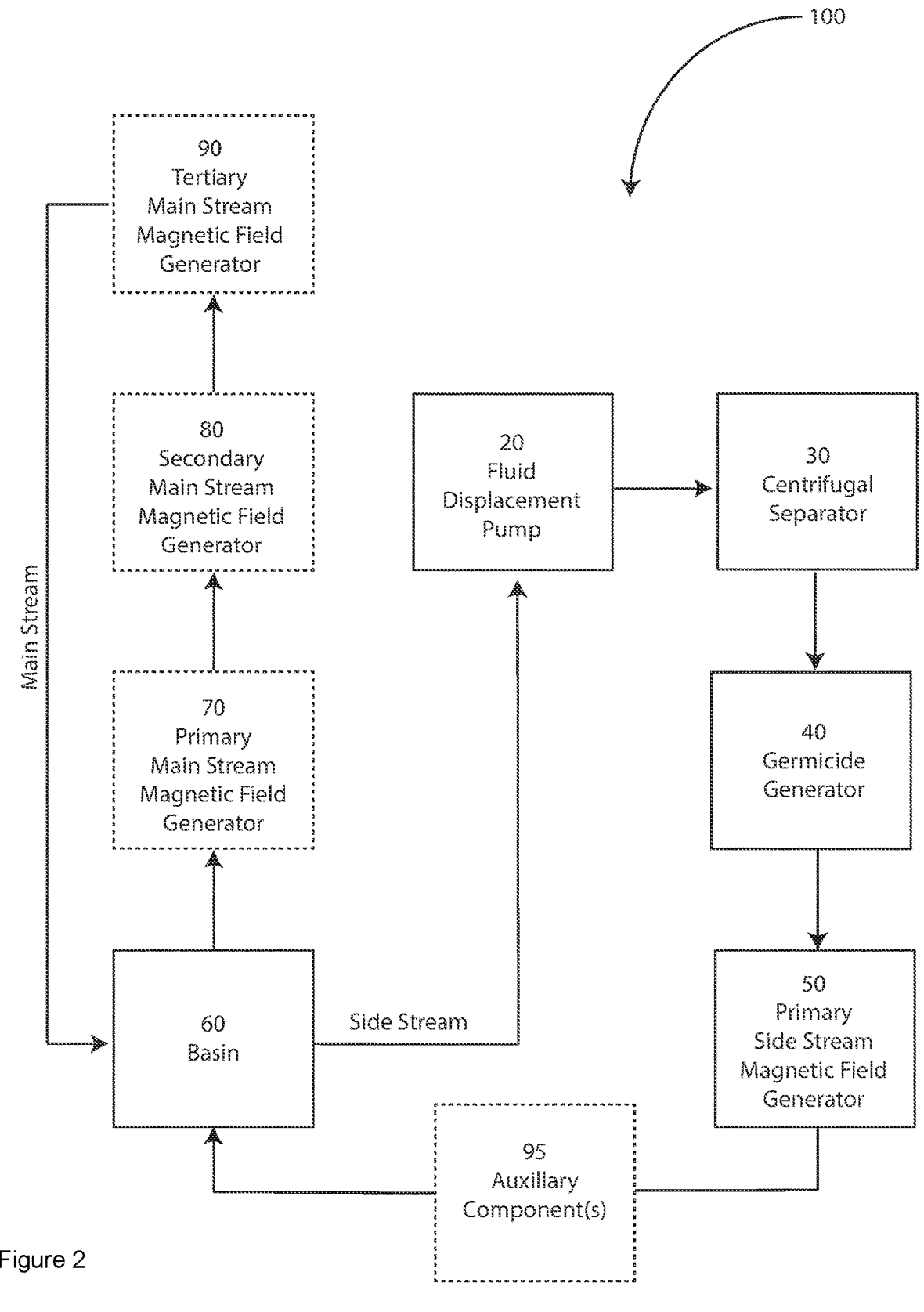
Figure 3:
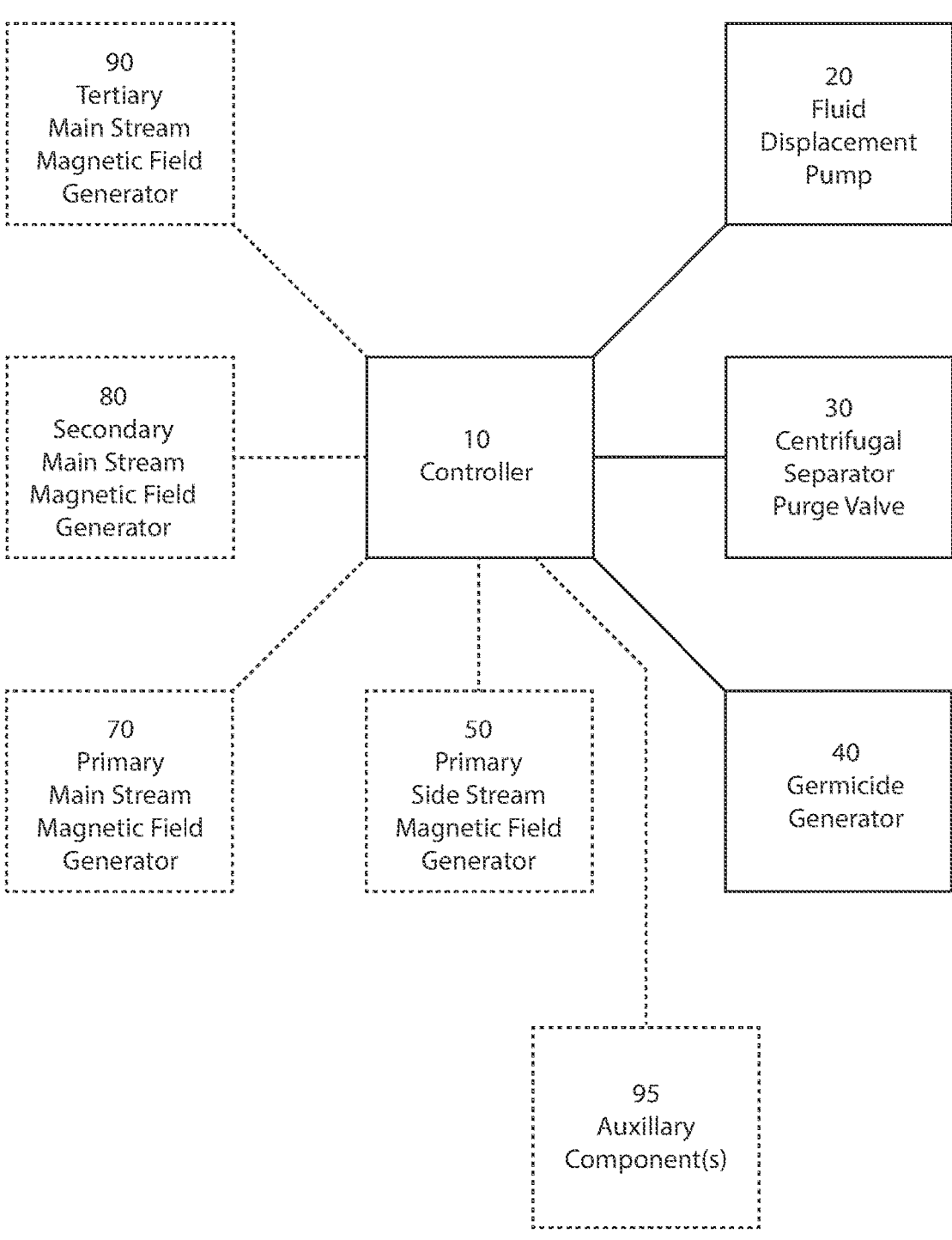
Figure 4:
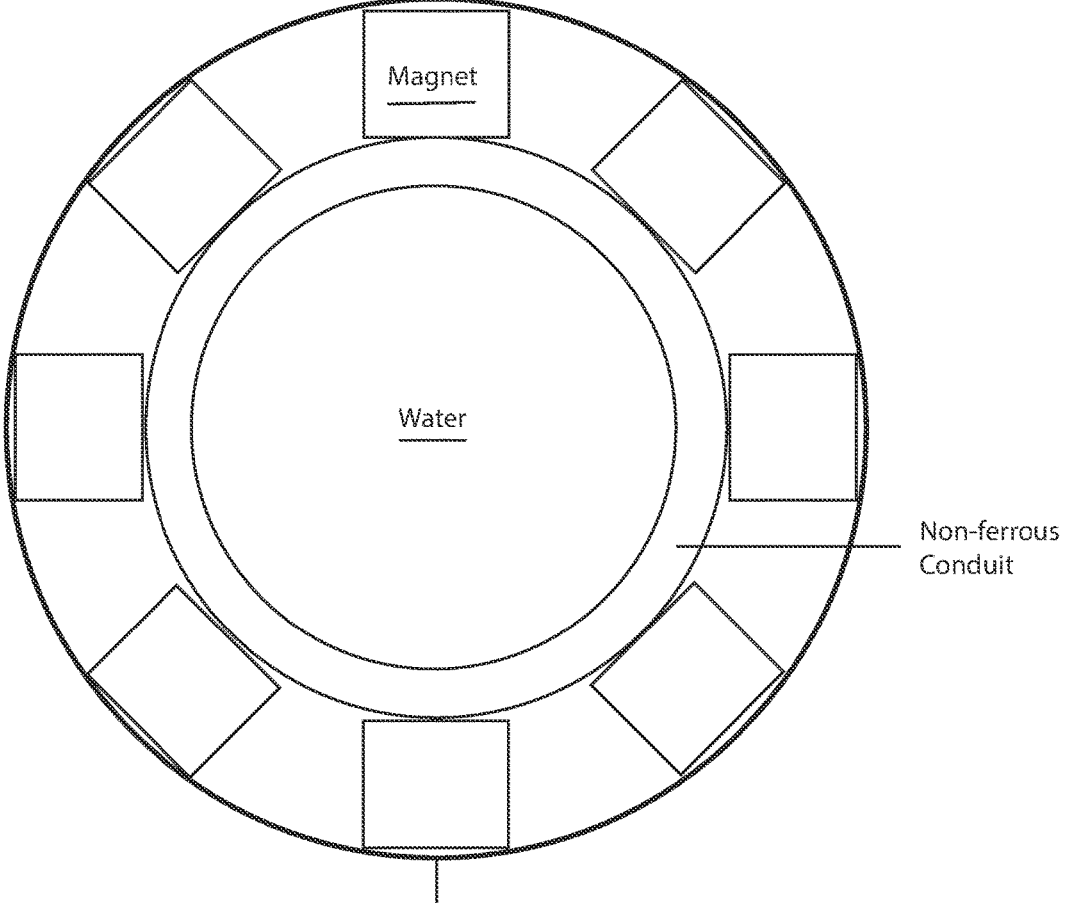

The invention will now be described with reference to the drawings wherein:

FIG. 1 of the drawings is schematic representation of a first embodiment of a water cooling system for use in accordance with the present invention;

FIG. 2 of the drawings is schematic representation of a second embodiment of a water cooling system for use in accordance with the present invention;

FIG. 3 of the drawings is schematic representation of an electronics assembly for use in accordance with the present invention; and FIG. 4 of the drawings is cross-sectional view of a magnetic field generator for use in accordance with the present invention.

DETAILED DESCRIPTION OF THE INVENTION

While this invention is susceptible of embodiment in many different forms, there is shown in the drawings and described herein in detail several specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings by like reference characters. In addition, it will be understood that the drawings are merely schematic representations of one or more embodiments of the invention, and some of the components may have been distorted from their actual scale for purposes of pictorial clarity.

Referring now to the drawings, and to FIG. 1 in particular, water cooling/recirculating management system 100 is shown which generally comprises controller 10 (See FIG. 3), fluid displacement pump 20, centrifugal separator 30, germicide generator 40, and primary side stream magnetic field generator 50. Water cooling/recirculating management system 100 eliminates the need for chemicals, bleed water, and labor to maintain recirculating water systems at peak efficiency. It will be understood that, unless otherwise noted, components of the present invention are connected via traditional fluid conduit and/or pipe. As discussed supra, this results in: (1) up to a 40% savings in energy consumption; (2) the elimination of chemical treatment costs; (3) the elimination of blowdown water and sewer costs; (4) the elimination of labor to clean/restore heat exchange equipment; and (5) greatly extended equipment life.

Fluid displacement pump 20 extracts water from main stream basin 60, prefilters the extracted water prior to association with centrifugal separator 30, and displaces the extracted water through a closed-circuit side stream. In accordance with the present invention, fluid displacement pump 20 preferably comprises a one to three horse power pool pump with a prefilter. Fluid displacement pump 20 is commercially available from, among other pool part vendors, Carvin (Magnum Force Series). Other fluid displacement pumps for use in accordance with the present invention include, for example, U.S. Pat. No. 7,854,597 entitled "Pumping System with Two Way Communication," U.S. Pat. No. 5,730,861 entitled "Swimming Pool Control System," U.S. Pat. No. 5,278,455 entitled "Spa and Pool Pump and Heater Control," and U.S. Pat. No. 4,678,409 entitled "Multiple Magnetic Pump System"—all of which are hereby incorporated herein by reference in their entirety including all references cited therein.

Centrifugal separator 30 includes an inlet, an outlet, and a solids collection chamber. Centrifugal separator 30 separates solids, prevents sludge accumulation, replaces blowdown and/or bleed, removes particles down to 40 microns, contains no filter medium or moving parts, provides for the continuous removal of solids, and/or provides for a purging mechanism that releases solids collected in the collection chamber. Such purging preferably occurs via an actuatable valve in communication with controller 10. Centrifugal separator 30 is commercially available from Lakos Equipment (IL-0150-B), Cole-Parmer, Grainger—among other vendors. Other centrifugal separators suitable for use in accordance with the present invention include, U.S. Pat. No. 8,182,408 entitled "Centrifugal Separator with External Bearings," U.S. Pat. No. 7,927,395 entitled "Centrifugal Separator," U.S. Pat. No. 7,824,459 entitled "Centrifugal Separator," U.S. Pat. No. 7,824,458 entitled "Centrifugal Separator," U.S. Pat. No. 7,811,347 entitled "Centrifugal Separator," U.S. Pat. No. 5,779,619 entitled "Centrifugal Separator," U.S. Pat. No. 5,735,789 entitled "Centrifugal Separator," U.S. Pat. No. 5,591,340 entitled "Centrifugal Separator," United States Patent Application Publication Number 2010/0011723 entitled "Centrifugal Separator," United States Patent Application Publication Number 2009/0013658 entitled "Centrifugal Separator," and Chinese Patent Number 2355771 entitled "Centrifugal Purifier"-all of which are hereby incorporated herein by reference in their entirety including all references cited therein.

Germicide generator 40 preferably comprises one or more electrodes fabricated from approximately 93 percent copper and approximately 7 percent silver. In another embodiment of the present invention, germicide generator 40 preferably comprises one or more electrodes fabricated from approximately 90 percent copper and approximately 10 percent silver. Germicide generator 40 eliminates the need for chemicals, utilizes a copper/silver ionization system, and destroys algae, bacteria, and viruses. Germicide generator 40 preferably operates one of three modes, namely: an off mode, a continuous on mode, and a non-continuous, pulse mode. Germicide generator 40 is commercially available from Caribbean Clear (ST-1). Other germicide generators suitable for use in accordance with the present invention include, for example, U.S. Pat. No. 9,695,073 entitled "Dual Biocide Generator," U.S. Pat. No. 6,929,740 entitled "Water Purification System," U.S. Pat. No. 5,453,207 entitled "Biocide Treatment System and Method," and International Patent Application Publication Number WO/2007060466 entitled "Ion Generator for Water Treatment"—all of which are hereby incorporated herein by reference in their entirety including all references cited therein.

Primary side stream magnetic field generator 50 preferably comprises at least one (e.g. 2, 4, 6, 8, 10, 12, etcetera)

permanent ceramic magnet. In accordance with the present invention, the permanent ceramic magnet preferably includes side-to-side polarity that is mounted to a non-ferrous pipe having the south pole facing inward toward the water (See FIG. 4). Primary side stream magnetic field generator 50 prevents scale formation, de-scales existing surfaces and piping, inhibits both general and galvanic corrosion, and, if present, increases heat exchanger efficiency by approximately 5-55 percent. Primary side stream magnetic field generator 50 will be, at the time of publication, commercially available from Prestige Energy Products (Rockford, Michigan).

In accordance with the present invention, side stream magnetic field generator 50 is placed after any turbulent event, such as a pump, filter, phase change, etcetera, and one is also placed just before the cooling tower. The magnetic effect under these circumstances will last roughly 7 minutes. If the pipe length and cycle flow time exceed 7 minutes, then additional magnetic field generators are added.

In further accordance with the present invention, water cooling/recirculating management system 100 preferably includes primary main stream magnetic field generator 70, secondary main stream magnetic field generator 80, and/or tertiary main stream magnetic field generator 90. It will be understood that the main stream magnetic field generators are configured in an analogous manner to the side stream magnetic field generators.

Referring now to FIG. 2, and in an alternative embodiment, water cooling/recirculating management system 100 may also include one or more side stream auxiliary components 95, such as an ultra violet light source, an ozone generator, a pressure switch to indicate the presence of side stream water flow, and/or a cooling fan. Non-limiting examples of auxiliary components suitable for use in accordance with the present invention include, for example, U.S. Pat. No. 9,943,618 entitled "Ultraviolet Light Source and Methods," U.S. Pat. No. 7,683,344 entitled "In-Line Treatment of Liquids and Gases by Light Irradiation," U.S. Pat. No. 6,299,761 entitled "Water Purifier System," U.S. Pat. No. 5,935,431 entitled "Ultraviolet Ozone Water Purifier for Water Disinfection," U.S. Pat. No. 10,724,515 entitled "Proportioning Pump Control Systems and Applicator Apparatus," and U.S. Pat. No. 10,851,638 entitled "Well Fracturing Systems with Electrical Motors and Methods of Use"—all of which are hereby incorporated herein by reference in their entirety including all references cited therein.

As is best shown schematically in FIG. 3, water cooling/recirculating management system 100 includes controller 10. Controller 10 is in electrical communication with fluid displacement pump 20, a dump or purge valve associated with centrifugal separator 30, and germicide generator 40. Controller 10 is optionally in communication with any auxiliary components 95 (e.g., UV light sources, ozone generators, switches, valves, cooling fans, etcetera). While the side stream and primary stream magnetic field generators of the present invention utilize permanent magnets, controller 10 can be in electrical communication if non-permanent and/or electromagnetic components are utilized.

Controller 10 preferably includes a programmable logic controller. The programmable logic controller includes one or more of a battery, a bridge rectifier, a capacitor, a central processing unit, a communications port, a control board, a crystal, a diode, a fuse, a graphics board, an inductor, an input port, an integrated circuit, a microprocessor, a memory module, an oscillator, an output port a potentiometer, a receiver, a relay, a resistor, a semiconductor, a transformer, a transistor, a tuner, a video processing unit, a wired communications hub, and/or a wireless communications hub.

In operation, the present invention is also directed to a method for treating cooling/recirculating water. The method includes extracting water from the main stream basin with the side stream fluid displacement pump. Next, the water is treated (e.g., solids are removed) via the centrifugal separator. The collected solids are periodically discharged via a dump or purge valve. After particle or solid separation, the water is treated with ions (e.g., $Cu^{2+}$, $Ag^+$, etcetera) via the germicide generator. Next, the water is exposed to at least one side stream magnetic field generator prior to being returned to the main stream basin. Optionally, water from the main stream basin can be treated with one or more main stream magnetic field generators as the water travels through the main stream loop. Notably, the water treatment methods of the present invention utilize physics instead of environmentally problematic chemistry to treat cooling/recirculating water and maintain the system at peak efficiency without the introduction of traditional chemicals.

The foregoing description merely explains and illustrates the invention and the invention is not limited thereto except insofar as the appended claims are so limited, as those skilled in the art who have the disclosure before them will be able to make modifications without departing from the scope of the invention.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etcetera shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etcetera. As a non-limiting example, each range discussed herein can be readily broken down into a lower third, middle third and upper third, etcetera. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

The invention claimed is:

1. A water cooling/recirculating management system for treating water in a cooling tower, the system comprising:
   a fluid displacement pump;
   a centrifugal separator;
   a germicide generator configured to destroy algae, bacteria, and viruses in water recirculated through the cooling tower;
   a primary side stream magnetic field generator, and
   a controller configured to coordinate operation of the fluid displacement pump, the centrifugal separator, and the germicide generator.

2. The water cooling/recirculating management system according to claim 1, wherein the controller coordinates operation of the fluid displacement pump, a purge valve of the centrifugal separator, and the germicide generator to treat cooling water.

3. The water cooling/recirculating management system according to claim 1, wherein the fluid displacement pump extracts water from a main stream basin, prefilters the extracted water prior to association with the centrifugal separator, and displaces the extracted water through a closed-circuit side stream.

4. The water cooling/recirculating management system according to claim 1, wherein the centrifugal separator includes an inlet, an outlet, and a solids collection chamber with a purge valve.

5. The water cooling/recirculating management system according to claim 1, wherein the centrifugal separator at least one of separates solids, prevents sludge accumulation, replaces blow-down and/or bleed, removes particles down to 40 microns, contains no filter medium or moving parts, provides for the continuous removal of solids, and provides for a purging mechanism that releases solids collected in a collection chamber.

6. The water cooling/recirculating management system according to claim 1, wherein the germicide generator comprises at least one electrode fabricated from approximately 93 percent copper and approximately 7 percent silver.

7. The water cooling/recirculating management system according to claim 1, wherein the germicide generator comprises at least one electrode fabricated from approximately 90 percent copper and approximately 10 percent silver.

8. The water cooling/recirculating management system according to claim 1, wherein the germicide generator utilizes a copper/silver ionization system configured to destroy algae, bacteria, and viruses in the water in the cooling tower.

9. The water cooling/recirculating management system according to claim 1, wherein the germicide generator operates in at least one of an off mode, a continuous on mode, and a non-continuous pulse mode.

10. The water cooling/recirculating management system according to claim 1, wherein the primary side stream magnetic field generator comprises at least one, permanent ceramic magnet.

11. The water cooling/recirculating management system according to claim 10, wherein the permanent ceramic magnet includes side-to-side polarity that is mounted to a non-ferrous pipe having the south pole facing inward toward the water.

12. The water cooling/recirculating management system according to claim 1, wherein the primary side stream magnetic field generator at least one of prevents scale formation, de-scales existing surfaces and piping, inhibits both general and galvanic corrosion, and, if present, increases heat exchanger efficiency by approximately 5-55 percent.

13. The water cooling/recirculating management system according to claim 1, further comprising an ultra violet light source.

14. The water cooling/recirculating management system according to claim 1, further comprising an ozone generator.

15. The water cooling/recirculating management system according to claim 1, further comprising a primary main stream magnetic field generator.

16. The water cooling/recirculating management system according to claim 15, further comprising a secondary main stream magnetic field generator.

17. The water cooling/recirculating management system according to claim 16, further comprising a tertiary main stream magnetic field generator.

18. The water cooling/recirculating management system according to claim 1, further comprising a pressure switch to indicate the presence of side stream water flow.

19. The water cooling/recirculating management system according to claim 1, further comprising a cooling fan.

20. A water cooling/recirculating management system for treating water in a cooling tower, consisting of:

a controller that coordinates operation of system components;

a fluid displacement pump that extracts water from a main stream basin and displaces the extracted water through a closed-circuit side stream;

a centrifugal separator having an inlet, an outlet, and a solids collection chamber with a purge valve;

a germicide generator utilizing copper/silver ionization electrodes configured to destroy algae, bacteria, and viruses in the water in the cooling tower; and a primary side stream magnetic field generator comprising at least one permanent ceramic magnet mounted to a non-ferrous pipe with south pole facing inward toward the water.

* * * * *